US008866877B2

(12) United States Patent
Calman et al.

(10) Patent No.: US 8,866,877 B2
(45) Date of Patent: Oct. 21, 2014

(54) SPLIT SCREEN PRESENTATION OF FUNCTIONALITY DURING A HOLD PERIOD PRIOR TO A CUSTOMER-SERVICE VIDEO CONFERENCE

(71) Applicant: Bank of America Corporation, Charlotte, NC (US)

(72) Inventors: Matthew A. Calman, Charlotte, NC (US); Alicia C. Jones, Fort Mill, SC (US); Elizabeth S. Votaw, Potomac, MD (US); Rajat Agrawal, Sunnyvale, CA (US); Wanwen Han, Jersey City, NJ (US); Su Liu, Pittsburgh, PA (US); Nir Rachmel, Brookline, MA (US); Lynn Streja, Pittsburgh, PA (US); Cameron Jungeun Park-Hur, Castro Valley, CA (US); James Robert Grimsley, Dover, FL (US)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 13/651,970

(22) Filed: Oct. 15, 2012

(65) Prior Publication Data
US 2014/0104366 A1  Apr. 17, 2014

(51) Int. Cl.
H04N 7/14  (2006.01)

(52) U.S. Cl.
USPC .................. 348/14.08; 379/309; 379/202.01; 709/204

(58) Field of Classification Search
CPC ........................... H04M 3/523; H04M 3/5108
USPC ........... 379/265.09, 266.01, 266.06; 370/260; 709/204; 348/14.08
See application file for complete search history.

(56) References Cited

U.S. PATENT DOCUMENTS

| 4,650,929 | A | 3/1987 | Boerger et al. |
| 6,223,983 | B1 | 5/2001 | Kjonaas et al. |
| 6,301,354 | B1 * | 10/2001 | Walker et al. ............ 379/266.01 |
| 6,430,174 | B1 * | 8/2002 | Jennings et al. ............... 370/352 |
| 6,820,260 | B1 * | 11/2004 | Flockhart et al. .............. 717/173 |
| 2009/0016512 | A1 | 1/2009 | Bryant et al. |
| 2009/0292583 | A1 * | 11/2009 | Eilam et al. ...................... 705/10 |
| 2014/0025448 | A1 * | 1/2014 | Maxfield et al. ............ 705/14.16 |
| 2014/0029745 | A1 * | 1/2014 | Lyman ..................... 379/265.12 |

OTHER PUBLICATIONS

U.S. Appl. No. 13/651,966, filed Oct. 15, 2012, Calman, Matthew A. et al.

(Continued)

Primary Examiner — Creighton Smith
(74) Attorney, Agent, or Firm — Michael A. Springs; Moore & Van Allen PLLC; James C. Edwards

(57) ABSTRACT

Embodiments of the invention are directed to systems, methods and computer program products for split-screen functionality to be provided to a user device during a hold period prior to a customer-service video conference. Specifically, according to defined embodiments, the present invention provides for a first portion of split-screen includes a visual depiction of a queue of users currently awaiting a video conference with the customer-service associate. The queue allows for the user/customer to gauge how long the hold period will last. In addition to the visual depiction of the hold queue, the split screen may provide for other portions of the screen to include other information and/or functionality such as, such as information related or unrelated to the impending video conference.

31 Claims, 6 Drawing Sheets

(56) References Cited

OTHER PUBLICATIONS

U.S. Appl. No. 13/652,120, filed Oct. 15, 2012, Calman, Matthew A. et al.
U.S. Appl. No. 13/651,798, filed Oct. 15, 2012, Calman, Matthew A. et al.
U.S. Appl. No. 13/651,674, filed Oct. 15, 2012, Calman, Matthew A. et al.
U.S. Appl. No. 13/652,326, filed Oct. 15, 2012, Calman, Matthew A. et al.
U.S. Appl. No. 13/652,093, filed Oct. 15, 2012, Calman, Matthew A. et al.
U.S. Appl. No. 13/652,175, filed Oct. 15, 2012, Calman, Matthew A. et al.

* cited by examiner

SPLIT SCREEN PRESENTATION OF FUNCTIONALITY DURING A HOLD PERIOD PRIOR TO A CUSTOMER-SERVICE VIDEO CONFERENCE

FIELD

In general, embodiments herein disclosed relate to communications and, more specifically, providing a split-screen presentation of functionality to users/customers during a hold period prior to a customer-service video conference.

BACKGROUND

With the advent of video camera functionality on many computing devices, including handheld computing devices, such as smart telephones, tablet devices and the like, the ability to conduct video conferencing in different contexts has flourished. Specifically, such video conferencing capabilities provides a platform for conducting live customer-service video conferences as opposed to conducting audio only communication via a telephonic customer-service interaction.

Not unlike the audio-only telephone customer-service interaction, in the video conferencing setting, the user/customer will often require being placed "on hold" prior to conducting the video conference due to the limited capacity of customer service associates tasked with conducting the video conferences. However, unlike the audio-only telephone customer-experience in which the hold period is generally limited to providing the user/customer with an audio experience, such as music, news or the like, video conferencing offers many opportunities in terms of enhancing the hold period. Such enhancement of the hold period is especially relevant since a video conference is typically conducted on a computing device (such as PC, laptop, tablet, smart phone or the like) which is configured for multitask functionality, such that the user/customer may remain productive throughout or at least be engaged in another activity during the hold period.

Therefore, a need exists to develop methods, apparatus, computer program products and the like that will enhance the user/customer experience during the hold period prior to conducting a video conference. The desired aspects of the invention should allow for the user to conduct other functions while waiting on hold for the video conference to begin. In addition to remaining productive during the hold period, the desired methods, apparatus and computer program products should provide the user/customer with useful information pertinent to the impending video conference.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Apparatus, methods and computer program products are defined that provide for split-screen functionality to be provided to a user device during a hold period prior to a customer-service video conference. Specifically, according to defined embodiments, the present invention provides for a first portion of split-screen includes a visual depiction of a queue of users currently awaiting a video conference with the customer-service representative. The queue allows for the user/customer to gauge how long the hold period will last. In addition to the visual depiction of the hold queue, the split screen may provide for other portions of the screen to include other information and/or functionality such as, but not limited to, a widget configured for onsite research related to subject matter of the video conference, a widget configured for offsite research related to subject matter of the video conference, such as widget including links to content related to the subject matter of the video conference, a game application configured to allow the user to play a game during the hold period, suggestions for conducting the video conference with one of one or more other customer-service associates, access to one or more video presentations, wherein the video presentations are associated with a subject matter of the video conference, service configuration options, including at least one of connection speed, quality of video, or quality of audio and the like.

An apparatus for providing information to a user during a hold period associated with a customer-service video conference defines first embodiments of the invention. The apparatus includes a computing platform including a memory and a processing device in communication with the memory. The apparatus further includes a customer-service video conferencing application stored in the memory and executable by the processing device. The customer-service video conferencing application is configured to cause the processing device to (1) receive a request from a user device to initiate a video conference between the user and a customer-service associate, (2) in response to receiving the request, place the user on hold awaiting the video conference based on the customer-service associate being currently unavailable, and (3) provide, during the hold period, a split-screen presentation of information to the user device, wherein a first portion of the split-screen presentation includes a visual depiction of a queue of users currently awaiting a video conference with the customer-service representative.

In specific embodiments of the apparatus, the customer-service video conferencing application is further configured to cause the processing device to provide, during the hold period, the split-screen presentation to the user device, wherein the split-screen presentation includes two or more portions, each portion providing the user at least one of information or functionality. For example, the split-screen presentation may provide for a dual split-screen in which one half of the screen provides specific information and/or functionality and the other half of the screen provides additional specific information or functionality. While in another example, the split-screen presentation may be configured such that one half of the screen provides specific information and/or functionality, and each of the two remaining quarters of the screen provide specific information and/or functionality.

In specific embodiments of the apparatus, the customer-service video conferencing application is further configured to cause the processing device to provide the visual depiction of the queue including a proximate hold time. In such embodiments of the apparatus, the customer-service video conferencing application may be further configured to cause the processing device to dynamically adjust the proximate hold time based on actual/observed time of a video conference experienced between the customer service associate and one of the queue of users.

In further specific embodiments of the apparatus, the customer-service video conferencing application is further configured to cause the processing device to provide, during the hold period, the split-screen presentation to the user device, such that a second portion of the split-screen presentation includes a widget configured for onsite research related to subject matter of the video conference and/or a widget configured for offsite research related to subject matter of the video conference, such as widget including links to content related to the subject matter of the video conference.

In still further embodiments of the apparatus, the customer-service video conferencing application is further configured to cause the processing device to provide, during the hold period, the split-screen presentation to the user device, such that a second portion of the split-screen presentation includes a game application configured to allow the user to play a game during the hold period.

In yet further embodiments of the apparatus, the customer-service video conferencing application is further configured to cause the processing device to provide, during the hold period, the split-screen presentation to the user device, such that a second portion of the split-screen presentation includes suggestions for conducting the video conference with one of one or more other customer-service associates, wherein the other customer-service associates currently have shorter hold periods than the customer-service associate.

Moreover, in additional embodiments of the apparatus, the customer-service video conferencing application is further configured to cause the processing device to provide, during the hold period, the split-screen presentation to the user device, such that a second portion of the split-screen presentation includes access to one or more video presentations, wherein the video presentations are associated with a subject matter of the video conference.

In additional embodiments of the apparatus, the customer-service video conferencing application is further configured to cause the processing device to provide, during the hold period, the split-screen presentation to the user device, such that a second portion of the split-screen presentation includes service configuration options, including at least one of connection speed, quality of video, or quality of audio.

In still further specific embodiments of the apparatus the customer-service video conferencing application is further configured to cause the processing device to provide, during the hold period, the split-screen presentation to the user device, such that a second portion of the split screen presentation includes a listing of one or more actions for the user to take during the hold period in preparation for the video conference.

A method for providing information to a user during a hold period associated with a customer-service video conference provides for second embodiments of the invention. The method includes (1) receiving, by a computing device processor, a request from a user device that is configured to request a video conference between the user and a customer-service associate, (2) in response to receiving the request, placing, by a computing device processor, the user on hold awaiting the video conference based on the customer-service associate being currently unavailable, and (3) providing, by a computing device processor, during the hold period, a split-screen presentation of information to the user device, wherein a first portion of the split-screen presentation includes a visual depiction of a queue of users currently awaiting a video conference with the customer-service representative.

A computer program product for providing information to a user during a hold period associated with a customer-service video conference defines third embodiments of the invention. The computer program product includes a non-transitory computer-readable medium. The computer-readable medium includes a set of codes for causing a computer to (1) receive a request from a user device that is configured to request a video conference between the user and a customer-service associate, (2) in response to receive the request, place the user on hold awaiting the video conference based on the customer-service associate being currently unavailable, and (3) provide, during the hold period, a split-screen presentation of information to the user device, wherein a first portion of the split-screen presentation includes a visual depiction of a queue of users currently awaiting a video conference with the customer-service representative.

Thus, as described in more details below, apparatus, methods and computer program products are defined that provide.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
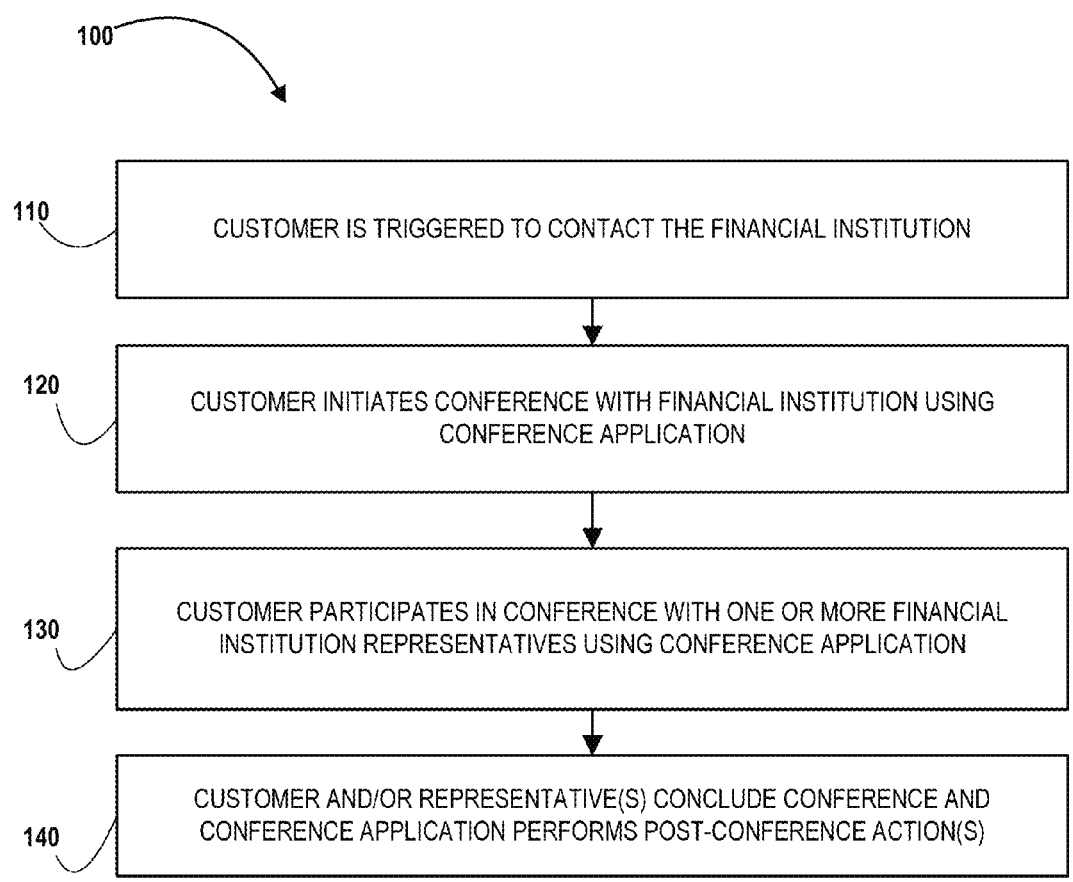
Figure 2:
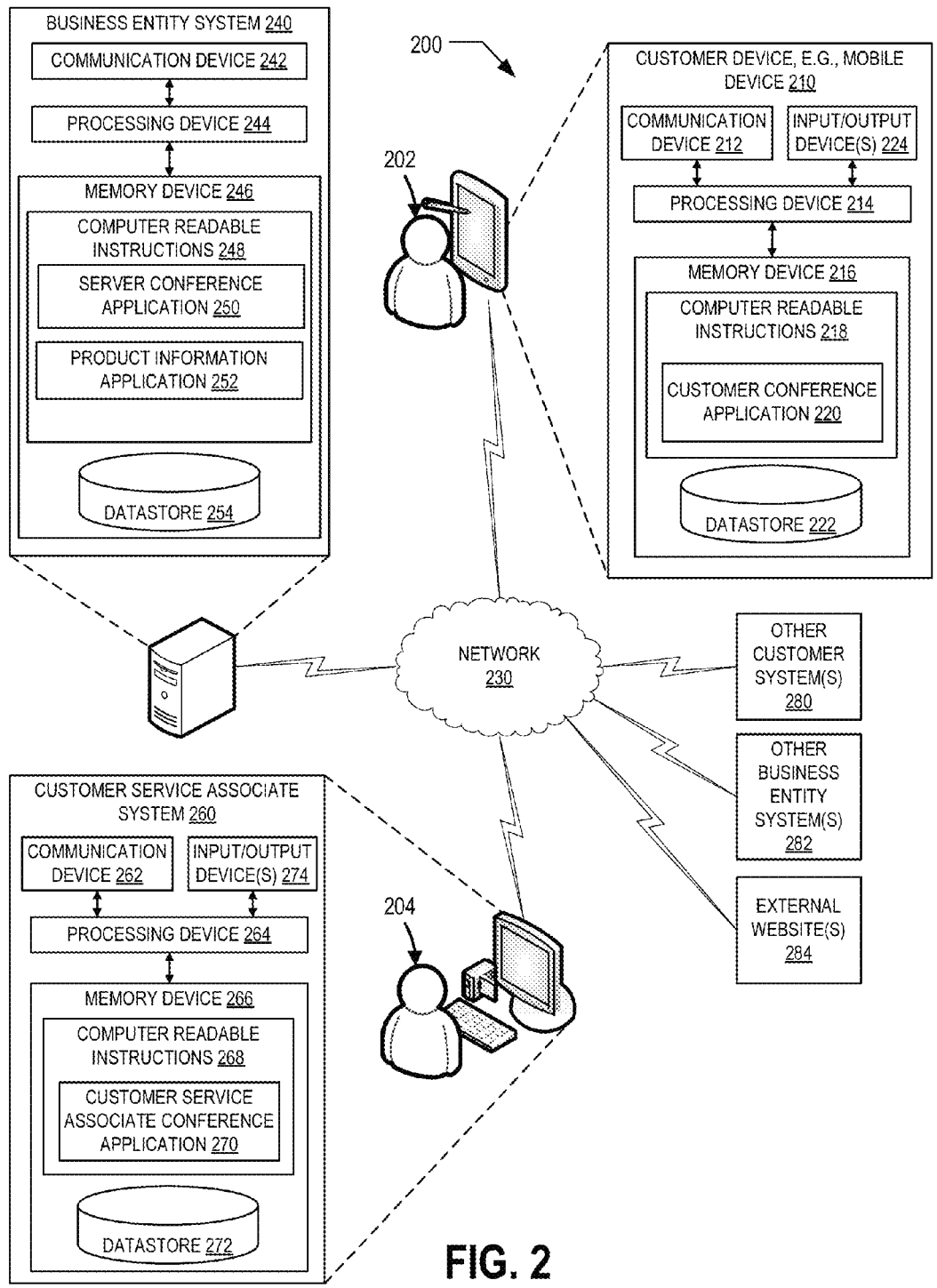
Figure 3:
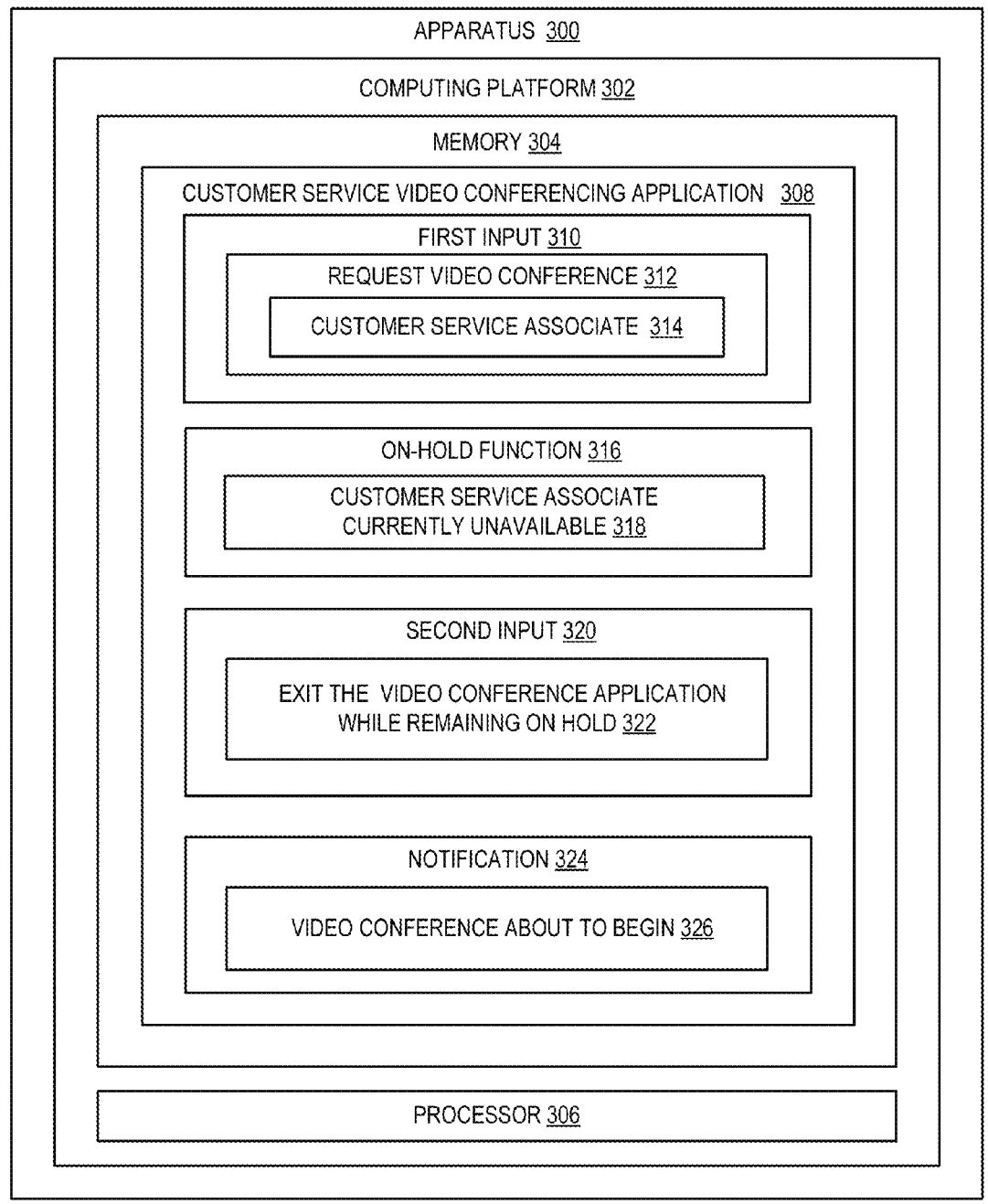
Figure 4:
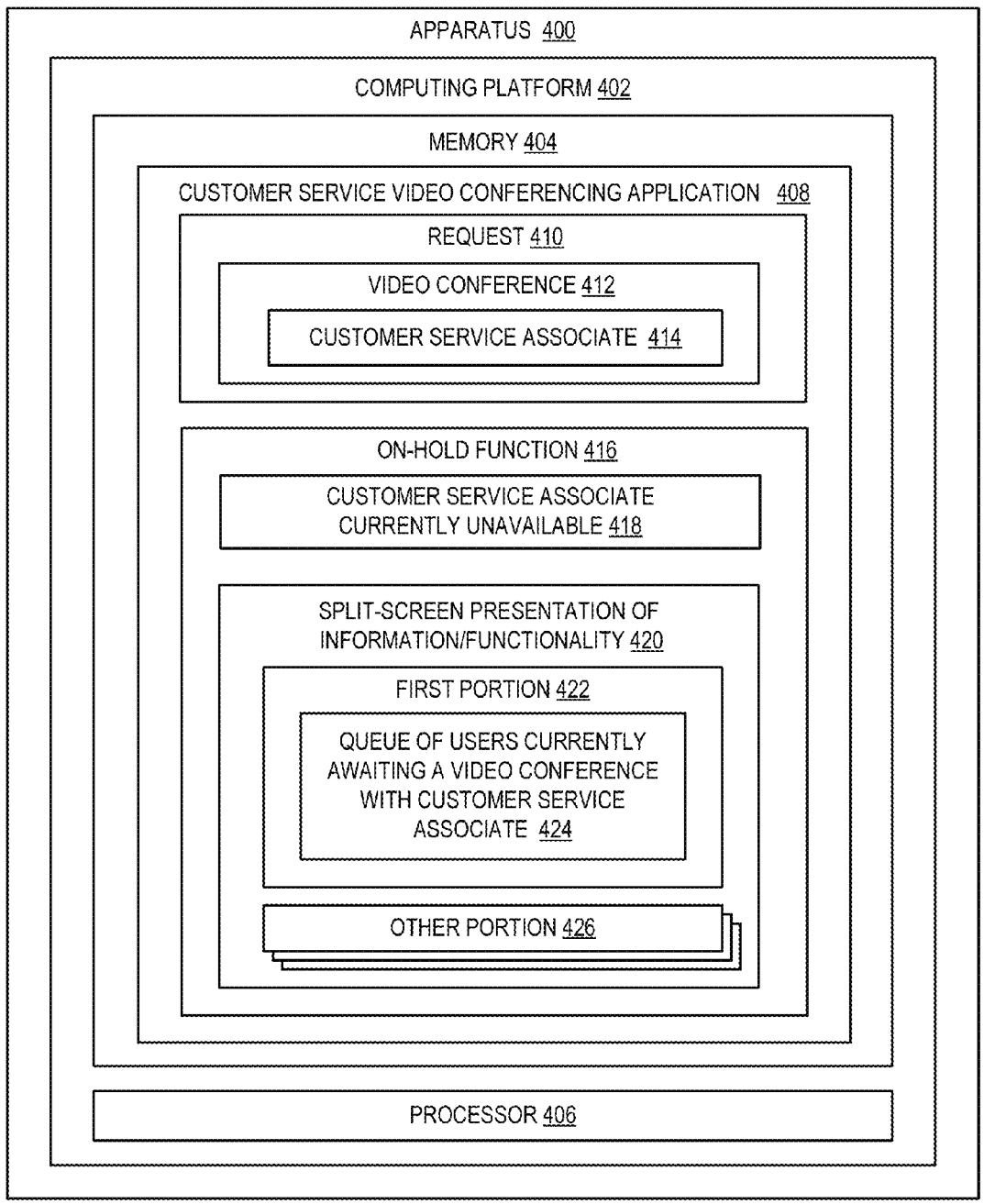
Figure 5:
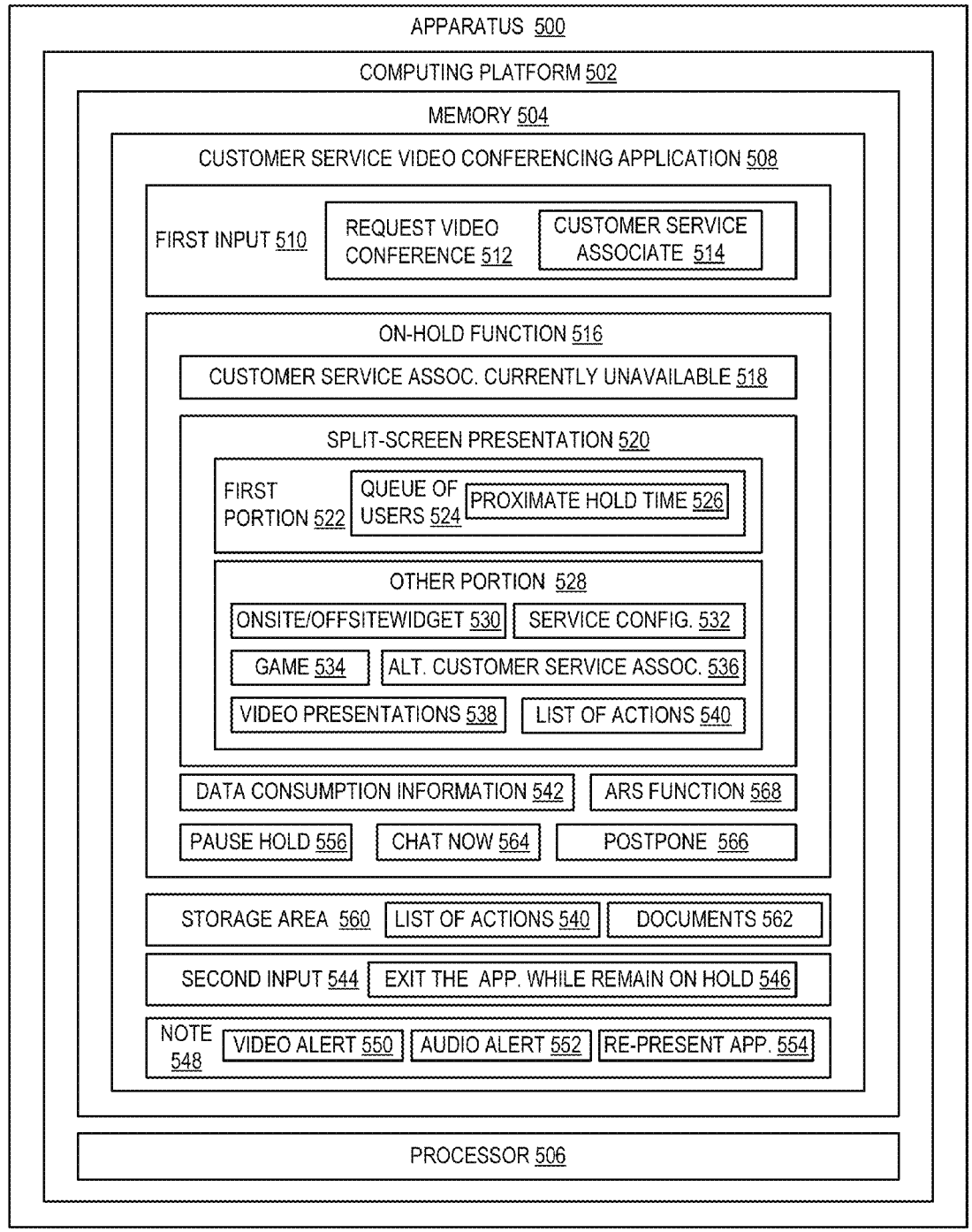
Figure 6:
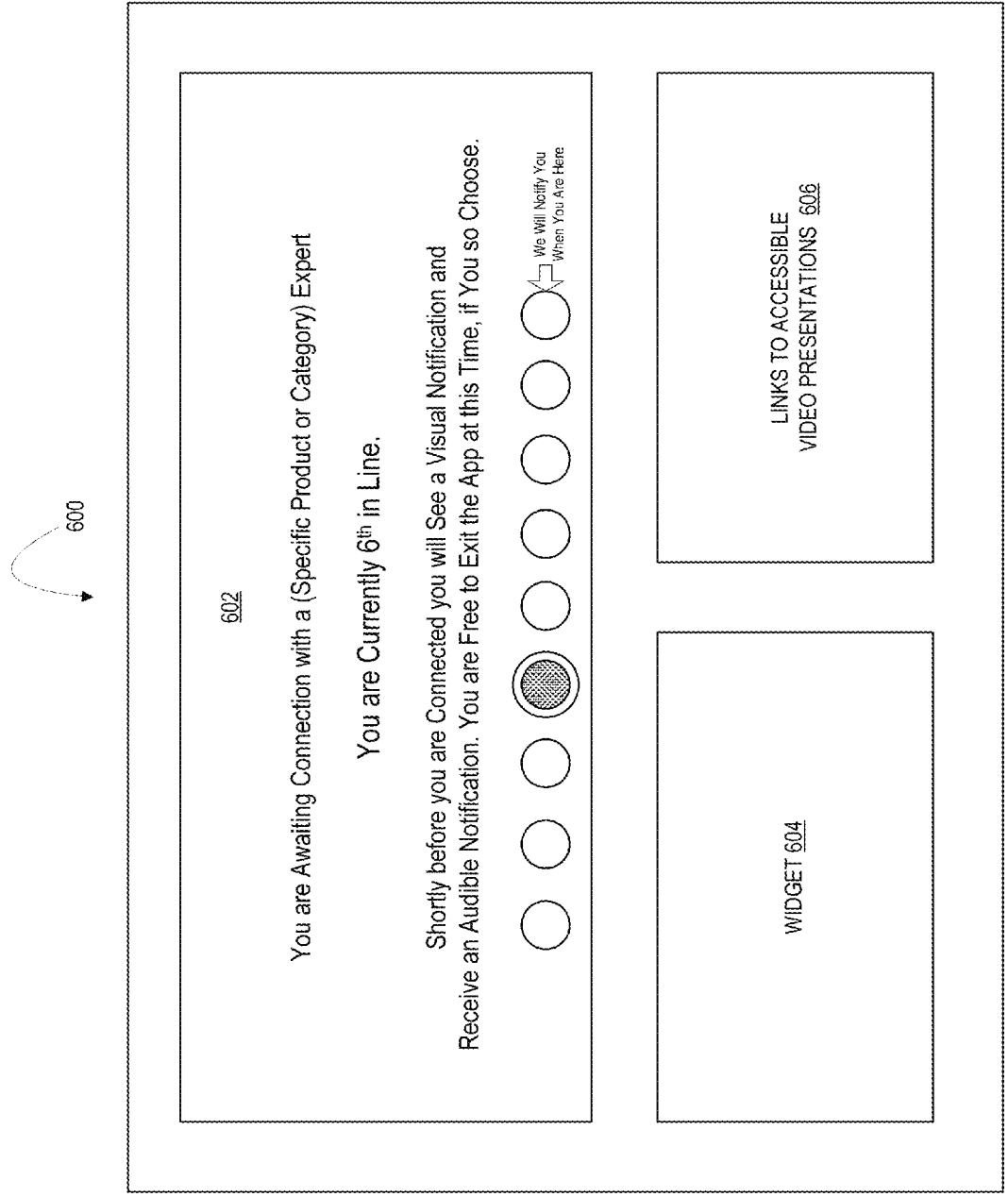

Having thus described embodiments of the invention in general terms, reference will now be made to the accompanying drawings, where:

FIG. 1 is a flow diagram of a method for providing a video conference between a financial institution customer and a financial institution associate; according to embodiments of the present invention;

FIG. 2 is a block diagram of a system for providing a video conference between a user/customer and a customer service associate; according to embodiments of the present invention;

FIG. 3 is a block diagram of an apparatus configured for allowing a user to exit a video conference application while on hold and notifying the user when their position in the hold queue is about to be up, in accordance with embodiment of the present invention;

FIG. 4 is a block diagram of an apparatus configured for providing split-screen presentation of information and/or functionality to a user/customer during a hold period while awaiting a customer service video conference, in accordance with embodiments of the present invention;

FIG. 5 is a block diagram of an apparatus highlighting alternative embodiments of the present invention; and FIG. 6 is a block diagram depiction of a split screen presentation of information/functionality during a hold period prior to a customer service video presentation, in accordance with embodiments of the present invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention enable users/customers to interact with customer service associates/representatives over video conferencing and/or audio conferencing using a conferencing application running on, for example, a network server and/or the customer's notebook computer. In certain specific embodiments the video conference is conducted between a financial institution associate/representative and a financial institution customer. The variety of features may provide a customer an unprecedented balance of convenience, personalization, and exceptional customer service. Before or at the beginning of a call, a customer is given a set of representatives, also referred to herein as a customer service associate. The customer may select a representative based on information provided about the representatives such as their numbers of years of experience. While the customer is waiting for the call to commence, the customer may be provided information indicating their place in a hold queue and/or the wait time until the call commences and may be given relevant information or links to information using the conference application, such as by a split-screen showing relevant information as well as hold queue and/or hold time information. In some cases, the customer is given an opportunity to play games or navigate the Internet for topics unrelated to the topic of the call. Once on a call, customers are given an opportunity to view and edit documents related to the call. In some instances, customers may collaborate on document creation and modification with the representative and the representative (or customer) may be able to point out sections of relevant documents to the customer such as by highlighting or inserting notes. The conferencing application may also generate an electronic call summary that may be specialized for the representative or the customer. This call summary may record the spoken words and convert them to text and correlate the text with the other interactions between the customer and the representative, for example, noting within the call log that the representative presented the customer with a specific document at a particular point in the conversation. The conferencing application may enable a customer to schedule a future conference with a representative with whom the customer has previously interacted (referred to as a "primary representative") or with a representative recommended by the primary representative. In some situations it may be advantageous for the conference to switch devices and/or include additional participants, so the conference application provides the customer flexibility in forwarding the call to other devices or back to the original device and/or inviting other participants onto the call.

Referring now to FIG. 1, a flowchart illustrates a process flow 100 representing the fundamental stages of a customer's interaction with a business entity, which in this example is a financial institution. At Block 110, the customer is triggered to contact the financial institution. Typically, the customer has a question about a financial product such as a product the customer is considering or a product the customer already owns. Whatever triggers the customer to initiate contact with the financial institution provides context for the conference regarding subject matter and may also provide the environment and circumstances surrounding the customer. Accordingly, various embodiments of the conferencing application were designed to address the needs and concerns of those customers who initiate conferences with the financial institution based on triggers. In order to maximize the customer experience and satisfaction with the conference application, and based in part on the triggers to the customer, the conference application, in some embodiments, ensures that the customer can make a personal connection with one or more financial institution representatives who may be able to provide expert advice to the customer regarding complex products or issues over a private and secure platform that overcomes common challenges to existing video technologies.

At Block 120 the customer initiates a conference with the financial institution using the conference application. The customer, having been triggered by an interest in a product or a question about a product or otherwise, may want to speak with a customer service representative. The customer, however, may not want to take the time to physically visit a brick and mortar financial institution location. The conference application provides an alternative to visiting a physical location along with numerous advantages to doing so such as the ability to electronically create and edit documents in collaboration with a representative.

In order to initiate a conference, a customer may use a customer device such as a computing device like a computer (desktop, laptop, tablet or the like), a smartphone or other computing device as represented by computing device 210 of FIG. 2. The computing device may have a video conference application installed in its memory. The video conference application may also be installed and running on one or more financial institution servers such that customers running the video conference application on a customer device can communicate with the conference application running at the financial institution or other business entity. The video conference application for the customer device may be the same or different than the conference application running on the networked servers.

The video conference application provides the customer an opportunity to select a representative with whom to "speak" in some embodiments. Several representatives may be presented to the customer in a list of representatives. In some embodiments, each of the representatives are presented by display of a still, moving, and/or live picture of the representative as well as some information about the representative. In some cases, the representative's professional qualifications and experience are presented to the customer for consideration, and in some cases, additional information about the representative is presented. For example, personal interest information may be presented, for example, the representative's hobbies, location, and favorite sports teams or favorite television shows may be presented to the customer for consideration. Once the customer has selected a representative to speak with, the application may, in the event that the customer service associate is not immediately available, place the customer "on hold" for an impending conference with the representative or may present the customer with a date and time in the future for scheduling a call with the representative. The application may then remind the customer of the scheduled call in a variety of ways, such as using electronic calendar entries, alarms and the like. Either prior to an immediate call, an impending call in which the user/customer is placed on hold or a scheduled call, the customer may input some pre-call information to provide context for the call with the representative.

In some cases, such as for a premier customer, the application may provide all of the customer service associates assigned to the customer or with whom the customer has previously spoken. For example, the loan officer, the financial planner, the personal banker and the like associated with the customer may be provided to the customer for selection during the pre-conference representative selection. The application may also rank the representatives (either or both of assigned representatives and representatives previously spoken with) based on customer input, experience in relevant field or otherwise.

While the customer is on hold waiting for a conference call, the customer may be presented with one or more productive options while holding. The customer may be presented with information regarding the customer's wait until the connection with a live representative is made, such as a visual depiction of the queue of customers waiting for customer service related to, for example, a specific category of assistance or a specific representative. The visual depiction may also include information related to the time to connection and may include a "snooze" virtual button or other virtual input mechanism that receives customer input indicating the customer's desire to postpone the video conference with the representative. During the hold, the customer may be presented with access to informational videos relevant to the upcoming call. In some instances, the videos may be recordings of the representative for whom the customer is waiting or another representative familiar to the customer. Similarly, the customer may be presented with a widget or a portion of the application screen, such as a portion of a split screen for performing onsite research or offsite research, providing games to play while waiting, providing a data consumption bar during the hold as well as during the call, providing quality of service options, such as choices for connection speed, quality of video/audio or the like, providing a listing of documents necessary and/or useful for the call and the like. In some instances, a widget or split screen portion provides access to the financial institution's online banking platform so that the customer may access information regarding his or her accounts maintained by the financial institution.

Referring again to FIG. 1, the next stage of customer interaction, at Block 130, is the customer participates in a conference with one or more financial institution representatives using the video conference application. During the conference, the customer may be provided with various functions for improving the conference experience, for example, document sharing, visual navigation, video chat and call controls and multiple participants.

The application may present to the customer persistent call controls, such as for accessing an on-demand customer service connection or other representative connection. An interface of the application may provide the customer an opportunity to highlight or select portions of text or graphics presented on the interface, such as highlighting portions of documents that are being discussed between the customer and the representative. The control of these shared documents may be retained by the representative or may be with the customer or both. The representative may direct the discussion away from a standard document to something more interactive such that the customer may have the ability to access portions of the document and enter/change information in the document. In some instances, the application may allow the customer and the representative to switch control of the document back and forth as necessary during the conference.

During a conference, a customer and/or a representative may need to bring one or more other people into the conference. This may be done by the customer, for example, by the customer vouching for the additional participant and, in some embodiments, verifying the additional participant electronically. In some cases, credentialing of the additional participant is by a verification process. When an additional representative is required on the conference, an interaction log may be provided to the new associate to bring him or her up to speed quickly. The customer may have a trusted group of representatives who may be quickly brought into a conference. If the customer has not interacted with a particular representative before, the customer may provide a confirmation of acceptance of a representative, based on pre-existing filters, review of provided representative information or the like.

In some embodiments, during a conference using the application, a customer is given an opportunity to promote and/or demote levels of connectivity. For example, the customer may choose to change from textual to audible to visual to audiovisual interaction with the financial institution representative and/or the opposite. Such channel hopping may be logged, such as in an interaction log. Also, the customer may auto-forward a connection initiated from a representative from one device to another device, such as from the customer's tablet computer to a smartphone. In some cases, the customer may forward the connection back to the original device or use a cross- and/or dual-channel presentation. For example, audio of the conference may be presented using one device and video may be presented using another device.

At Block 140, the customer and/or the representative concludes the conference and the video conference application may perform one or more post-conference actions. For example, an e-receipt (also called an interaction log) may be finalized. The interaction log may be created automatically by the application during the conference and may include a recording and/or a textual representation of the words spoken during the conference. The interaction log may but used by the customer and/or the representative as a record of the call and the information/document shared during the call. From the perspective of the customer, the log may be used as a reference when completing tasks after the call has ended such as gathering or completing additional documents or following up as necessary. In addition to voice recordings and written text, the log may include, for example, copies of documents discussed, links to other information, highlighting and or notes taken during the call, and possibly timestamps indicating when in the call various actions occurred or documents were reviewed/highlighted and the like. The log may incorporate manual input as well. For example, the log may accept confirmation of portions of a conversation from one or both participants. In some instances, one or both participants may be able to remove unnecessary or repetitive portions of the log as desired. The log may include inset indications of highlighting of interface items and/or documents discussed during the conference. The participants of the conference may have different versions of the log, such as versions allowing the customer to comment/edit within the log manual and versions allowing the representative to comment/edit within the log manually.

In some embodiments, after the call has been completed archives of the interaction log and any documents discussed, created, edited or otherwise are stored by the financial institution and/or by the customer device (for offline access). These documents may be retrieved by the customer, such as by using the application or by logging into the customer's online banking website portal. In some embodiments, the application prompts the customer whether to store one or more of the log and/or the other document(s) discussed and prompts the customer regarding the storage location. In some embodiments, the customer is also given the option of communicating the log and/or other documents to one or more electronic destinations such as to one or more email addresses or the like.

Referring now to FIG. 2, a block diagram illustrates an environment 200 wherein a customer 202 participates in a conference with a customer service associate 204 using a customer device 210 and a customer service representative system 260, respectively. The environment also may include a business system 240, other customer systems 280, other business systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other business entity applications such as the customer video conference application 220. The customer device 210 may be or include a computer system, server, multiple computer system, multiple servers, or some other computing device configured for use by a user, such as a desktop, laptop, tablet, or a mobile communications device, such as a smartphone. The mobile device 210 has a communication device 212 communicatively coupled with a processing device 214, which is also communicatively coupled with a memory device 216 and one or more input and/or output devices 224, for example, an image capture device such as camera and/or a microphone. The processing device 214 is configured to control the communication device 212 such that the customer device 210 communicates across the network 230 with one or more other systems, for example, the customer service associate system 260. The processing device 214 is also configured to access the memory device 216 in order to read the computer readable instructions 218, which in some embodiments include a customer video conference application 220. The memory device 216 also may have a datastore 222 or database for storing pieces of data for access by the processing device 214.

The customer service associate system 260 may be a workstation used by a representative to communicate with customers using the video conference application. In some embodiments, the customer service associate system 260 may communicate with one or more of the other systems or devices and may perform one or more steps and/or one or more methods as described herein. In some embodiments, the customer service associate system 260 includes a communication device 262 communicatively coupled with a processing device 264, which is also communicatively coupled with a memory device 266 one or more input and/or output devices 224, for example, an image capture device such as camera and/or a microphone. The processing device 264 controls the communication device 262 such that the customer service associate system 260 communicates across the network 230 with one or more other systems or devices. The processing device 264 is also configured to access the memory device 266 in order to read the computer readable instructions 268, which in some embodiments include a customer service associate video conference application 270 having instructions for communicating with the customer video conference application 220 running on the customer device 210 and/or the server video conference application 250 running on the business entity system 240. In some embodiments, the customer service associate system 260 includes one or more datastores 272 for storing and providing one or more pieces of data used by the representative during conferences with customers.

A business entity system 240 is a computer system, server, multiple computer systems and/or servers or the like. The business entity system 240, in the embodiments shown has a communication device 242 communicably coupled with a processing device 244, which is also communicably coupled with a memory device 246. The processing device 244 is configured to control the communication device 242 such that the business entity system 240 communicates across the network 230 with one or more other systems. The processing device 244 is also configured to access the memory device 246 in order to read the computer readable instructions 248, which in some embodiments includes a server video conference application 250. The memory device 246 also has a datastore 254 or database for storing pieces of data for access by the processing device 244. In some embodiments, the customer service associate video conference application interacts with the server video conference application to access information, document or other data for use during a conference call. In some embodiments, a product information application 252 retrieves information regarding products being discussed during a call between a customer and a representative and provides the information to the customer and/or the representative during the call and/or after the call has ended.

The applications 220, 250 and 270 are for instructing the processing devices 214, 244 and 264 to perform various steps of the methods discussed herein, and/or other steps and/or similar steps. In various embodiments, one or more of the applications 220, 250 and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with a representative through network 230. In various embodiments, the applications 220, 250 and 270 stored and executed by different systems/devices are different. In some embodiments, the applications 220, 250 and 270 stored and executed by different systems may be similar and may be configured to communicate with one another, and in some embodiments, the applications 220, 250 and 270 may be considered to be working together as a singular application despite being stored and executed on different systems. In some embodiments, the applications 220, 250 and 270 stored and executed by the customer device and/or an application stored and executed on one of the other systems is a standalone application 220 and does not necessarily communicate or rely on any other applications for data, processing or otherwise, except for providing a connection with a representative through the application 270.

In various embodiments, one of the systems discussed above, such as the business entity system 240, is more than one system and the various components of the system are not collocated, and in various embodiments, there are multiple components performing the functions indicated herein as a single device. For example, in one embodiment, multiple processing devices perform the functions of the processing device 244 of the business entity system 240 described herein. In various embodiments, the business entity system 240 includes one or more of the customer service associate system 260, the other business entity systems 282, and/or any other system or component used in conjunction with or to perform any of the method steps discussed herein.

In various embodiments, the business entity system 240, the customer device 210, the customer service associate system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

Referring now to FIG. 3, a block diagram is provided of an apparatus 300 configured for allowing users to exit the customer service video conference application while remaining on hold and subsequently be notified when their video conference is about to be initiated. The apparatus 300 includes a computing platform 302 having a memory 304 and a processor 306 in communication with the memory 306. The memory 304 of apparatus 300 stores customer service video conferencing application 308, which is configured to provide users/customers the capability to conduct a customer service video conference.

As such, customer service video conferencing application 308 is configured to receive a first input 310 from a user device that serves as a request 312 for a video conference with a customer service associate 314. As previously noted, in specific embodiments the customer service video conferencing application 308 is configured to allow the user to select a specific customer service associate 314 based on criteria deemed important to the user/customer. For example, the customer may select a customer service associate 314 based on their knowledge of the subject matter of the video conference, familiarity with a preferred language for communicating during the video conference, similar interests/location/affinities or the like.

In response to receiving the first input 310, the customer service video conferencing application 308 is further configured to invoke an on-hold function 316, which places the user "on-hold" or in a hold queue based on the customer service associate currently be unavailable 318, for example, the customer service may be conducting a video conference with another customer or the like. In specific embodiments, once the user/customer is placed on hold the user will be presented, via a display associated with the user device that requested the video conference, a visual depiction of the hold queue which may indicate the place that the user/currently stands in the hold queue specific to the customer service associate. In addition, the visual depiction of the hold queue may include a proximate wait time, which may be based on the average time for a conference. It should be noted that the average time for a conference may further be refined based on the average time for a conference of the subject matter desired to be discussed during the conference currently in the hold queue.

The customer service video conferencing application 308 is further configured to receive a second input 320 from the user device that requests an exit 322 from the customer service video conferencing application 308 while the user remains on hold for the pending video conference. In this regard, the exiting 322 of the application 308 does not close the application but rather places the application in a sleep mode. Exiting 322 of the application 308 by the user allows the user to perform any other function on the user device, such as activating and implementing any other application, program, module or the like on the user device.

Further, the customer service video conferencing application 308 is configured to communicate a notification 324 to the user of the imminence of the video conference 326 based on the impending availability of the customer service associate. For example, the notification may be communicated 324 when the user/communicate is first (i.e., next) in line for participating in a video conference with the customer service associate. The notification 324 may be in the form of a visual notification/alert that appears on the user device display notifying the user of their position in the hold queue and requesting that the user re-activate the customer service video conferencing application 308. In addition to the visual notification or in lieu of the visual notification, an audible notification/or alert may be provided, such as an audio ringtone/chime or the like, which upon recognition by the user prompts the user to re-activate the customer service video conferencing application 308.

Referring to FIG. 4, another block diagram is provided of an apparatus 400 configured for presenting a split-screen presentation of information and/or functionality to users during a hold period prior to a customer-service video conference, in accordance with embodiments of the present invention. The apparatus 400 includes a computing platform 402 having a memory 404 and a processor 406 in communication with the memory 406. The memory 404 of apparatus 400 stores customer service video conferencing application 408, which is configured to provide users/customers the capability to conduct a customer service video conference.

Similar to the embodiment described in FIG. 3, the customer service video conferencing application 408 is configured to receive a request 410 from a user device to initiate a video conference 412 with a customer service associate 414. As previously noted, in specific embodiments the customer service video conferencing application 408 is configured to allow the user to select a specific customer service associate 414 based on criteria deemed important to the user/customer.

In response to receiving the request 410, the customer service video conferencing application 408 is further configured to invoke an on-hold function 416, which places the user "on-hold" or in a hold queue based on the customer service associate currently be unavailable 418, for example, the customer service may be conducting a video conference with another customer, temporarily away from their work station or the like.

In accordance with embodiments, once the user/customer is placed on hold the customer service video conferencing application 408 is configured to provide the user device with a split-screen presentation 420 of information/functionality. In this regard, the split-screen presentation is defined as more than two portions or separate areas within the displayable area, such that each portion/area presents distinct and separate information or functionality. Further, in accordance with specific embodiments of the invention, customer service video conferencing application 408 is configured to present a first portion 422 of the split-screen presentation 420 that includes a visual depiction of a queue of users 424 currently awaiting a conference with the customer customer-service associate. In addition, the visual depiction of the hold queue may include a proximate wait time, which may be based on the average time for a video conference.

In addition to the first portion, the split-screen presentation 420 will include one or more other portions 426 or areas of the split screen which are configured to include other information or functionality related or unrelated to the subject matter of the impending video conference. Specific examples of the information or functionality provided in the other portions 426 are provided for in the discussion associated with FIG. 5, infra.

Referring to FIG. 5, a block diagram is depicted of an apparatus 500 configured for providing user/customers with video conferences and related information/functionality during hold periods while awaiting the video conference, in accordance with embodiments of the present invention. Specifically, FIG. 5 provides description of alternative embodiments of the present invention. As previously described, the apparatus 500 includes a computing platform 502 having one or more processors 506 and a memory 504 in communication with the processor(s) 506. The memory 504 may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk.

Further, computing platform 502 also includes processor 506, which may be an application-specific integrated circuit ("ASIC"), or other chipset, processor, logic circuit, or other data processing device. Processor 506 or another processor such as ASIC may execute an application programming interface ("API") (not shown in FIG. 5) that interfaces with any resident programs, such as customer-service video conference application 506 or the like stored in the memory 504 of the apparatus 500.

Processor 506 may include various processing subsystems (not shown in FIG. 5) embodied in hardware, firmware, software, and combinations thereof that enable the functionality of apparatus 500 and the operability of the apparatus 500 on a wired or wireless network. For example, processing subsystems allow for initiating and maintaining communications and exchanging data with other devices in the network. For the disclosed aspects, processing subsystems of processor 506 may include any subsystem used in conjunction with customer-service video conference application 506 or sub-components or sub-modules thereof.

The memory 504 of apparatus 500 includes customer service video conferencing application 508 is configured to receive a first input 510 (i.e., request) from a user device to initiate a video conference 512 with a customer service associate 514. In response to receiving the first input 510, the customer service video conferencing application 508 is further configured to invoke an on-hold function 516, which places the user "on-hold" or in a hold queue based on the customer service associate currently be unavailable 518, for example, the customer service may be conducting a video conference with another customer, temporarily away from their work station or the like. It should be noted that if the customer service associate is currently available, the need to invoke the on-hold function 516 is obviated.

In addition, to invoking the on-hold function 516 prior to a video conference, the application 508 may further be configured to invoke the on-hold function 516 during a video conference, as the discretion of the customer or the financial institution associate, if the customer or the financial institution associate is interrupted or otherwise becomes unavailable during the video conference.

In accordance with certain embodiments, once the user/customer is placed on hold the customer service video conferencing application 508 may be configured to provide the user device with a split-screen presentation 520 of information/functionality. Further, in accordance with specific embodiments of the invention, customer service video conferencing application 508 is configured to present a first portion 522 of the split-screen presentation 520 that includes a visual depiction of a queue of users 524 currently awaiting a conference with the customer customer-service associate. En example of a visual depiction of a queue of users 524 is shown and described in relation to FIG. 6, infra.

In addition, the visual depiction of the hold queue may include a proximate hold time 526, which may be based on the average time for a conference. In specific embodiments of the invention, the customer service video conferencing application 508 may be configured to dynamically adjust the proximate hold time 526 based on actual conference time experienced by a user who was previously in the queue of users 524 awaiting a conference with the customer service associate. For example, if the average time for a conference is ten minutes and the current conference lasted five minutes, the proximate hold time 526 may be decreased by five minutes to reflect the less than average conference time of the current conference. Conversely, if the current conference lasted minutes, the proximate hold time 526 may be increased by twenty minutes to reflect the more than average conference time of the current conference. In addition, the proximate hold time 526 that is indicated to the user may reflect the average conference time for a conference of the subject matter for which those in the queue of users 524 desire to discuss. For example, if one of the users in the queue has indicated a desire to conduct a video conference concerning home mortgage loans and the average home mortgage loan conference lasts 25 minutes, the proximate hold time 526 will be determined based partially on the 25 minute average conference time for home mortgage loans.

In addition to the first portion, the split-screen presentation 520 will include one or more other portions 526 or areas of the split screen which are configured to include other information or functionality related or unrelated to the subject matter of the impending video conference. Since the portions only occupy a designated area of the user device, in certain embodiments, the portions may be activatable, such as by clicking, tapping or the like, to increase the portion to full view display (i.e., maximizing the portion to full screen display).

The following provides examples of what information or functionality may be displayed in the other portions 528 of the split-screen presentation 520. It should be noted that these are examples only and are not intended to be limiting. In addition, while the information and functionality are discussed herein in relation to a split-screen presentation 520 it should be noted that in other embodiments of the invention such information and functionality may be provided by the customer-service video conferencing application 506 absent the split-screen presentation. In other words, the information and functionality discussed herein may be provided during in stand-alone presentations during the hold period based on business entity configuration and/or user configuration.

The other portions 526 may include an onsite or offsite widget 530. The widget may be configured for researching the subject matter of the impending video conference. An "onsite" widget may be associated with the business entity conducting the video conference. For example, if the business entity is a financial institution, the "onsite" widget may provide access to online banking, account balances or the like, which the user may desire to access in preparation for the video conference. An "offsite" widget may provide access to non-business entity-related content, such as links to general information related to the subject matter of the video conference. If the user chooses to access a link provided in an "offsite" widget, the user will exit the customer-service video conferencing application 506 but remain on-hold and be notified, via visual and/or audio alert, when their video conference is about to commence.

Additionally, other portion 526 may include service configuration 532 that is configured to allow the user to select and/or adjust the level of service provided by the video conference. For example, the user may select a desired connection speed, quality of audio, quality of video or the like for the impending video conference. The user's data rate plan with their network service provider may dictate what level of service they desire for the video conference.

Moreover, the service configuration 532 may recommend/suggest that the user transfer the connection to alternate network, for example transfer the connection from a cellular network to a Wi-Fi network to maximize service quality and/or minimize cost. In addition, service configuration 532 may recommend/suggest that the user conduct a telephone conference as opposed to a video conference based on the subject matter of their video conference. If the user chooses to transfer from the video conference to a telephone conference, the application 508 may be configured to seamlessly transfer the communication channel without the user having to perform any other functions and/or without the user losing their position of the hold queue.

In addition, other portion 526 may include a game application 534, which is configured to allow the user to play a game during the hold period. Other forms of entertainment may also be provided in other portion 526, such as movie trailers, music videos, news entries, songs, and the like. In a specific embodiment, other portion 526 may include music/video/entertainment programming provided by the financial institution or such programming may be configured to be programming chosen by the customer. In addition advertising may be provided alone or in conjunction with the game application or other entertainment forms to provide a revenue stream for the business entity.

In other embodiments, other portion 526 may suggestions for conducting the video conference with alternate customer-service associates 536 who currently have shorter hold periods than the customer service associated selected by or assigned to the user. For example, one or more alternate customer-service associates 536 having similar attributes to the currently selected (or assigned) customer service associate or otherwise being knowledgeable in the subject matter of the video conference may be suggested to the user as an alternative option for conducting the video conference. In addition, to suggesting the alternate customer service associates 536, a current average hold time for each of the alternate customer service associates may be displayed so that the user may choose a customer-service associate that minimizes their hold period. In addition, search functionality may be provided to the user that allows for the user to search for an alternative customer-service associate based on subject matter, similar attributes, least amount of hold period or the like.

The other portion 528 may additionally provide access, in the form of links or the like, to pre-recorded video presentations 538 related to the subject matter of the video conference or otherwise related to the selected customer service associate. In this regard the video presentations may be listed or otherwise displayed in order of their relevancy to the subject matter of the video conference and/or video presentations conducted by the selected customer-service associate may be listed/displayed first. For example, one or more of the pre-recorded video presentations may be conducted by the selected customer service associate. In such embodiments, the customer-service associate may provide information about themselves, i.e., an introduction, their background, or the like, or the customer-service associate may provide information related to the subject matter of the video conference. In the event that the user accesses and views one or more of the video presentations, the customer service associate is provided, just prior to conducting the video conference, details as to which video presentations the user viewed during the hold period so as to further facilitate and add efficiency to the video conference process.

In addition, other portion 528 may include a list of actions 540 (e.g., a to-do-list) and associated instructions which the user may be asked to take to assist in the video conference or are otherwise required to be taken in preparation for the video conference. The list of actions 540 may be in the form of a checklist, such that the user may check-off items form the list once they are performed. Actions may include completing forms, uploading documents/forms to a business entity server/portal for review/approval/discussion during the video conference. The actions may require that the user exit the customer service video conferencing application 508 to perform the necessary functions, however, as previously discussed, the user may exit the application without losing their place in the hold queue. In addition, the other portion 528 may provide for a staging/presentation area for the papers or documents that customer wishes to or has been instructed to upload/share during the video conference. In addition the staging area may provide for the user to create notes or a to-do-list of the topics they wish to cover during the video conference. In such embodiments of the invention, the notes or to-do-list may be visible to the financial institution associate prior to and/or during the video conference. In other embodiments, the application 528 may be configured to capture the notes and/or to-do list by recording the voice inputs of the customer.

In addition, the customer service video conferencing application 508 may include a storage unit 560, i.e., memory, configured to store the list of actions 540 or the documents 562 prepared for the video conference in the event that the video conference is interrupted (accidentally or on purpose) or otherwise does not occur (i.e., postponed) or the video conference is transferred to a voice-only channel or a text/chat session.

Additionally, the customer service video conferencing application 508 may be configured to provide for display of a data consumption information indicator 542, in the form or a data consumption bar or the like, which indicates the current amount of data transferred and/or an approximation of the amount of the data that will transferred during the video conference based on the subject matter of the video conference and the average time and/or average amount of data transferred during a video conference.

In addition, the customer service video conferencing application 508 may be configured to provide an Automated Response System (ARS) function 568 to provide the customer assistance with pre-video conference questions they may have about the video conference or the subject matter/purpose of the video conference. The ARS system may provide for the customer to input their question and based on keywords in the question present the customer with one or more speculative answers to the question.

In addition, the customer service video conferencing application 508 may be configured to provide for a pause hold feature 556 which is configured to be activated by the user to "pause" the hold period. In this regard, if the user wishes to prolong the period of time for which they are on hold because something the interim has occurred which will prohibit them from participating in the immediate future, they user may activate the pause hold feature 556. The pause hold feature 556 may be configured such that the user does not lose their place in the queue of user 524. For example, if the user was fourth in line when they activated the pause hold feature 556 they will remain fourth in line until they deactivate the pause hold feature 556.

In addition, the customer service video conferencing application 508 may be configured to provide for postponement feature 566 that is configured to be engaged by the customer to postpone the video conference until a later time. Activation of the function may result in display of input screen for a future appointment time or the like. Scheduling of a future appointment may require the customer be online at the scheduled appointment time or the application may be configured to call the customer prior to the appointment time. The call may be a telephone call or a visual display on a computing device on which the application 508 is executed.

Moreover, the customer service video application 508 may be configured to include "chat now" functionality in the form of an activatable "chat now" key 564 or the like, which upon activation by the customer instantaneously activates a chat session (voice or text) with a financial institution associate. The chat session can occur in lieu of the scheduled video conference or can be conducted in preparation for the pending video conference (e.g., ask questions pertaining to the to-do-list or the like).

The customer service video conferencing application 508 is further configured to allow the user to exit the application while remaining on hold. As such, the application is configured to receive an input 544 from the user device that requests an exit 546 from the customer service video conferencing application 508 while the user remains on hold for the pending video conference. In this regard, the exiting 546 of the application 508 does not close the application but rather places the application in a sleep mode. Exiting 546 of the application 508 by the user allows the user to perform any other function on the user device, such as activating and implementing any other application, program, module or the like on the user device.

Further, the customer service video conferencing application 508 is configured to communicate a notification 548 to the user of the imminence of the video conference based on the impending availability of the customer service associate. For example, the notification 548 may be communicated when the user/communicate is first (i.e., next) in line for participating in a video conference with the customer service associate. By communicating the notification when the user is next-in-line as opposed to when the video conference actually begins, the user is afforded the time necessary to properly align themselves with the video camera to insure proper video feed is provided to the customer service associate. The notification 548 may be in the form of a visual notification/alert 550 that appears on the user device display notifying the user of their position in the hold queue and requesting that the user re-activate the customer service video conferencing application 508. In addition to the visual notification or in lieu of the visual notification, an audio notification/alert 552 may be provided, such as an audio ringtone/chime or the like, which upon recognition by the user prompts the user to re-activate the customer service video conferencing application 508. Moreover, notification 548 may be provided by representing the application, such as re-presenting the split-screen presentation or a presentation of the hold queue to the user that indicates that the user is next-in-line for the video conference.

Turning the reader's attention to FIG. 6 a block diagram is provided of an exemplary split-screen presentation of information/functionality during a hold period prior to a video conference, in accordance with embodiments of the present invention. The split-screen presentation 600 may be displayed on any computing device on which the user has requested a video conference. Such computing devices may include, but are not limited to, a personal computer, a laptop computer, a tablet computer, a smartphone or the like. The split-screen presentation includes a first portion 602 that occupies the upper half of the split screen presentation 600. The first portion 602 includes a visual indication of the queue of users awaiting a video conference with the selected (or assigned) customer service associate. In the illustrated embodiment, the visual indication includes the type of associate that the user is holding for as defined by the customer service associate's field of expertise, i.e., the subject matter for the video conference. Additionally, the visual indication provides the user's current numerical position in the queue and notifies that the user that they may exit the app and that both visual and audible notification will be provided shortly before they are connected with the customer service associate. In additional embodiments, not shown in FIG. 6, the first portion may include the proximate hold time for the user in conjunction with or in lieu of the position in the queue of users.

The split-screen presentation 600 additionally includes two other portions 604 and 606. By way of example only, other portion 604 located in the bottom left-hand corner includes a widget, which provides the user functionality and is typically related to the subject matter of the video conference. The widget may be onsite widget, such as a widget associated with the business entity conducting the video conference or an offsite widget related to an external entity. In addition, other portion 606 includes links to accessible video presentations. The links may be text that briefly describes the topic of the pre-recorded video presentation or the links may thumbnail images of the video presentations with an accompanying topic. The links may be sorted/presented in order of their relevance to the subject matter of the video conference or pre-recorded video presentations conducted by the selected customer service associate may be presented first. Video presentations provided for may be scrollable and or searchable within the provided area. Additionally, selection of a video by the user may automatically provide for full screen display of the video presentation or may be configured such that the user may choose full screen presentation of the video. It should be noted that the split-screen presentation 600 shown in FIG. 6 may include more or less than the three portions shown. In addition, as described in relation to FIG. 5, the other portions 604 and 606 may provide for additional information or functionality other than a widget and/or access to pre-recorded video presentations.

In one specific embodiment of the invention, one of the other portions 604 and/or 606 are configured to be a private "share screen" widget that is accessible and visible only to the customer(s) and not, at any point in time, visible or accessible to the financial institution associate. Such a private "share screen" widget is beneficial if more than two customers (for example a husband and wife) are participating in a three-way video conference with the financial institution associate from different locations (i.e., using different devices) and the two customers desire to compare notes virtually without the financial institution associate seeing or having access to the notes or documents displayed in the private "share screen".

In summary, embodiments of the invention are directed to systems, methods and computer program products for split-screen functionality to be provided to a user device during a hold period prior to a customer-service video conference. Specifically, according to defined embodiments, the present invention provides for a first portion of split-screen includes a visual depiction of a queue of users currently awaiting a video conference with the customer-service representative. The queue allows for the user/customer to gauge how long the hold period will last. In addition to the visual depiction of the hold queue, the split screen may provide for other portions of the screen to include other information and/or functionality such as, but not limited to, a widget configured for onsite research related to subject matter of the video conference, a widget configured for offsite research related to subject matter of the video conference, such as widget including links to content related to the subject matter of the video conference, a game application configured to allow the user to play a game during the hold period, suggestions for conducting the video conference with one of one or more other customer-service associates, access to one or more video presentations, wherein the video presentations are associated with a subject matter of the video conference, service configuration options, including at least one of connection speed, quality of video, or quality of audio and the like.

This application incorporates by reference in their entirety each of the following applications filed concurrently herewith. Each application is assigned to the same inventive entity as the present invention:

United States Patent Application Ser. No. 13,651,966, entitled SYSTEM PROVIDING AN INTERACTIVE CONFERENCE, filed Oct. 15, 2012, in the name of applicant Calman et al.;

United States Patent Application Ser. No. 13/652,120, entitled PROVIDING A RECORD OF AN INTERACTIVE CONFERENCE, filed Oct. 15, 2012, in the name of applicant Calman et al.;

United States Patent Application Ser. No. 13/651,798, entitled ADAPTIVE SCAFFOLDING OF LEVELS OF CONNECTIVITY DURING A CONFERENCE, filed Oct. 15, 2012, in the name of applicant Calman et al.;

United States Patent Application Ser. No. 13/651,674, entitled FUNCTIONALITY DURING A HOLD PERIOD PRIOR TO A CUSTOMER SERVICE VIDEO CONFERENCE, filed Oct. 15, 2012, in the name of applicant Calman et al.;

United States Patent Application Ser. No. 13/652,326, entitled MULTIPLE-PARTICIPANT CUSTOMER SERVICE CONFERENCE, filed October 15, 2012, in the name of applicant Calman et al.;

United States Patent Application Ser. No. 13/652,093, entitled REPRESENTATIVE SELECTION FOR CUSTOMER SERVICE CONFERENCE, filed Oct. 15, 2012, in the name of applicant Calman et al.; and United States Patent Application Ser. No. 13/652,175, entitled REPRESENTATIVE PRE-SELECTION FOR CUSTOMER SERVICE CONFERENCE, filed Oct. 15, 2012, in the name of applicant Calman et al.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for providing information to a user during a hold period associated with a customer-service video conference, the apparatus comprising:
    a computing platform including a memory and a processing device in communication with the memory; and
    a customer-service video conferencing application stored in the memory, executable by the processing device, and configured to cause the processing device to:
        receive a request from a user device to initiate a video conference between the user and a customer-service associate,
        in response to receiving the request, place the user on hold awaiting the video conference based on the customer-service associate being currently unavailable, and
        provide, during the hold period, a split-screen presentation of information, within a viewable display of the user device, that includes more than one portion, wherein a first portion of the split-screen presentation includes a visual depiction of a queue of users currently awaiting a conference with the customer-service associate and wherein a second portion of the split-screen presentation includes access to one or more video presentations, wherein the video presentations are associated with a subject matter of the video conference.

2. The apparatus of claim 1, wherein the customer-service video conferencing application is further configured to cause the processing device to provide the visual depiction of the queue, wherein the visual depiction includes a proximate hold time.

3. The apparatus of claim 2, wherein the customer-service video conferencing application is further configured to cause the processing device to provide the visual depiction of the queue, wherein the visual depiction includes the proximate hold time, wherein the proximate hold time is dynamically adjusted by the customer-service associate based on actual time of a video conference with one of the queue of users.

4. The apparatus of claim 1, wherein the customer-service video conferencing application is further configured to cause the processing device to provide, during the hold period, the split-screen presentation within the viewable display of the user device, wherein a third portion of the split-screen presentation includes a widget configured for onsite research related to subject matter of the video conference.

5. The apparatus of claim 1, wherein the customer-service video conferencing application is further configured to cause the processing device to provide, during the hold period, the split-screen presentation within the viewable display of the user device, wherein a third portion of the split-screen presentation includes a widget configured for offsite research related to subject matter of the video conference.

6. The apparatus of claim 1, wherein the customer-service video conferencing application is further configured to cause the processing device to provide, during the hold period, the split-screen presentation within the viewable display of the user device, wherein a third portion of the split-screen presentation includes a game application configured to allow the user to play a game during the hold period.

7. The apparatus of claim 1, wherein the customer-service video conferencing application is further configured to cause the processing device to provide, during the hold period, the split-screen presentation within the viewable display of the user device, wherein the split-screen presentation includes two or more portions, each portion providing the user at least one of information or functionality.

8. The apparatus of claim 1, wherein the customer-service video conferencing application is further configured to cause the processing device to provide, during the hold period, the split-screen presentation within the viewable display of the user device, wherein a third portion of the split-screen presentation includes suggestions for conducting the video conference with one of one or more other customer-service associates, wherein the other customer-service associates currently have shorter hold periods than the customer-service associate.

9. The apparatus of claim 1, wherein the customer-service video conferencing application is further configured to cause the processing device to provide, during the hold period, the split-screen presentation within the viewable display of the user device, wherein a third portion of the split-screen presentation includes service configuration options, including at least one of connection speed, quality of video, or quality of audio.

10. The apparatus of claim 1, wherein the customer-service video conferencing application is further configured to cause the processing device to provide, during the hold period, the split-screen presentation within the viewable display of the user device, wherein a third portion of the split screen presentation includes a listing of one or more actions for the user to take during the hold period in preparation for the video conference.

11. A method for providing information to a user during a hold period associated with a customer-service video conference, the method comprising:
    receiving, by a computing device processor, a request from a user device that is configured to request a video conference between the user and a customer-service associate;
    in response to receiving the request, placing, by a computing device processor, the user on hold awaiting the video conference based on the customer-service associate being currently unavailable; and providing, by a computing device processor, during the hold period, a split-screen presentation of information, within a viewable display of the user device, that includes more than one portion, wherein a first portion of the split-screen presentation includes a visual depiction of a queue of users currently awaiting a conference with the customer-service associate and wherein a second portion of the split-screen presentation includes access to one or more video presentations, wherein the video presentations are associated with a subject matter of the video conference.

12. The method of claim 11, wherein providing the split-screen presentation of information further comprises providing, by the computing device, a split-screen presentation of information within the viewable display of the user device, wherein the first portion of the split-screen presentation includes the visual depiction of the queue, wherein the visual depiction includes a proximate hold time.

13. The method of claim 12, further comprising dynamically adjusting, by a computing device processor, the proximate hold time based on the customer service associate providing actual time of a video conference with one of the queue of users.

14. The method of claim 11, wherein providing the split-screen presentation of information further comprises providing, by the computing device, the split-screen presentation of information within the viewable display of the user device, wherein a third portion of the split-screen presentation includes a widget configured for onsite research related to subject matter of the video conference.

15. The method of claim 11, wherein providing the split-screen presentation of information further comprises providing, by the computing device, the split-screen presentation of information within the viewable display of the user device, wherein a third portion of the split-screen presentation includes a widget configured for offsite research related to subject matter of the video conference.

16. The method of claim 11, wherein providing the split-screen presentation of information further comprises providing, by the computing device, the split-screen presentation of information within the viewable display of the user device, wherein a third portion of the split-screen presentation includes a game application configured to allow the user to play a game during the hold period.

17. The method of claim 11, wherein providing the split-screen presentation of information further comprises providing, by the computing device, the split-screen presentation of information within the viewable display of the user device, wherein the split-screen presentation includes two or more portions, each portion providing the user at least one of information or functionality.

18. The method of claim 11, wherein providing the split-screen presentation of information further comprises providing, by the computing device, the split-screen presentation of information within the viewable display of the user device, wherein a second portion of the split-screen presentation includes suggestions for conducting the video conference with one of one or more other customer-service associates, wherein the other customer-service associates currently have shorter hold periods than the customer-service associate.

19. The method of claim 11, wherein providing the split-screen presentation of information further comprises providing, by the computing device, the split-screen presentation of information within the viewable display of the user device, wherein a third portion of the split-screen presentation includes service configuration options, including at least one of connection speed, quality of video, or quality of audio.

20. The method of claim 11, wherein providing the split-screen presentation of information further comprises providing, by the computing device, the split-screen presentation of information within the viewable display of the user device, wherein a second portion of the split-screen presentation includes a listing of one or more actions for the user to take during the hold period in preparation for the video conference.

21. A computer program product for providing information to a user during a hold period associated with a customer-service video conference, the computer program product comprising:
a non-transitory computer-readable medium comprising a set of codes for causing a computer to:
receive a request from a user device that is configured to request a video conference between the user and a customer-service associate;
in response to receive the request, place the user on hold awaiting the video conference based on the customer-service associate being currently unavailable;
provide, during the hold period, a split-screen presentation of information, within the viewable display of the user device, that includes more than one portion, wherein a first portion of the split-screen presentation includes a visual depiction of a queue of users currently awaiting a conference with the customer-service associate and wherein a second portion of the split-screen presentation includes access to one or more video presentations, wherein the video presentations are associated with a subject matter of the video conference.

22. The computer program product of claim 21, wherein the computer readable medium further comprises a set of codes for causing the computer to notify the user of the imminence of the video conference by one or more of an audio notification, a visual notification or a return presentation of the customer-service video application.

23. The computer program product of claim 21, wherein the set of codes for causing the computer to provide the split-screen presentation of information further comprises the set of codes for causing the computer to provide the split-screen presentation of information within the viewable display of the user device, wherein the first portion of the split-screen presentation includes the visual depiction of the queue, wherein the visual depiction includes a proximate hold time.

24. The computer program product of claim 23, further comprising a set of codes for causing a computer to dynamically adjust the proximate hold time based on the customer service associate providing actual time of a video conference with one of the queue of users.

25. The computer program product of claim 21, wherein the set of codes for causing the computer to provide the split-screen presentation of information further comprises the set of codes for causing the computer to provide the split-screen presentation of information within the viewable display of the user device, wherein a third portion of the split-screen presentation includes a widget configured for onsite research related to subject matter of the video conference.

26. The computer program product of claim 21, wherein the set of codes for causing the computer to provide the split-screen presentation of information further comprises the set of codes for causing the computer to provide the split -screen presentation of information within the viewable display of the user device, wherein a third portion of the split-screen presentation includes a widget configured for offsite research related to subject matter of the video conference.

27. The computer program product of claim 21, wherein the set of codes for causing the computer to provide the split-screen presentation of information further comprises the set of codes for causing the computer to provide the split-screen presentation of information within the viewable display of the user device, wherein a third portion of the split-screen presentation includes a game application configured to allow the user to play a game during the hold period.

28. The computer program product of claim 21, wherein the set of codes for causing the computer to provide the split-screen presentation of information further comprises the set of codes for causing the computer to provide the split-screen presentation of information within the viewable display of the user device, wherein the split-screen presentation includes two or more portions, each portion providing the user at least one of information or functionality.

29. The computer program product of claim 21, wherein the set of codes for causing the computer to provide the split-screen presentation of information further comprises the set of codes for causing the computer to provide the split-screen presentation of information within the viewable display of the user device, wherein a third portion of the split-screen presentation includes suggestions for conducting the video conference with one of one or more other customer-service associates, wherein the other customer-service associates currently have shorter hold periods than the customer-service associate.

30. The computer program product of claim 21, wherein the set of codes for causing the computer to provide the split-screen presentation of information further comprises the set of codes for causing the computer to provide the split-screen presentation of information within the viewable display of the user device, wherein a third portion of the split-screen presentation includes service configuration options, including at least one of connection speed, quality of video, or quality of audio.

31. The computer program product of claim 21, wherein the set of codes for causing the computer to provide the split-screen presentation of information further comprises the set of codes for causing the computer to provide the split-screen presentation of information within the viewable display of the user device, wherein a third portion of the split-screen presentation includes a listing of one or more actions for the user to take during the hold period in preparation for the video conference.

* * * * *